United States Patent Office 3,420,771
Patented Jan. 7, 1969

3,420,771
HYDROREFINING ASPHALTENIC PETROLEUM CHARGE STOCKS
Mark J. O'Hara, Prospect Heights, and William K. T. Gleim, Island Lake, Ill., assignors to Universal Oil Products Company, Des Plaines, Ill., a corporation of Delaware
No Drawing. Filed Mar. 17, 1966, Ser. No. 534,998
U.S. Cl. 208—216                                5 Claims
Int. Cl. C10g 23/02

ABSTRACT OF THE DISCLOSURE

Hydrorefining of petroleum stocks containing asphaltenes, sulfur and nitrogen with a catalyst prepared by combining hydrated silica (5–15% water of hydration) and molybdenum, drying the composite and calcining it to a temperature of 600–1200° F. A portion of the charge stocks is formed into lower-boiling hydrocarbons. The catalyst may also contain an iron group metal.

─────────

The invention described herein relates to the hydrorefining of asphaltenic petroleum charge stocks including crude oils and other heavy hydrocarbon fractions and/or distillates derived therefrom, for the primary purpose of reducing the concentration of contaminating influences contained therein. More particularly, the present invention is directed toward a catalytic process for hydrorefining an asphaltene-containing hydrocarbon charge stock, which charge stock is further contaminated by the inclusion of sulfurous and/or nitrogenous compounds.

Petroleum crude oils, especially topped or reduced crude oils, as well as other heavy hydrocarbon fractions and/or distillates, including black oils, vis-breaker effluent, atmospheric and vacuum tower bottoms product, tar sand oils, etc., contain various non-metallic and metallic impurities which detrimentally affect various processes to which such heavy hydrocarbon fractions may be subjected. Included among the non-metallic impurities are large quantities of nitrogen, sulfur, and oxygen, usually found to exist as heteroatomic compounds. Nitrogen is particularly undesirable since it effectively poisons various catalytic composites which may be employed in subsequent processes for the conversion of these petroleum fractions. Nitrogenous and sulfurous compounds are objectionable since the combustion of various fuels containing these impurities causes the release of nitrogen oxides and sulfurous oxides which are noxious, corrosive, and present, therefore, a serious problem with respect to pollution of the atmosphere.

In addition, petroleum charge stocks contain a high-boiling fraction comprising high molecular weight asphaltenic compounds. These are non-distillable, oil-insoluble coke precursors which may contain sulfur, nitrogen, oxygen, and a variety of metals. They are generally colloidally dispersed within a petroleum crude oil, vacuum or tower bottoms product, and, when subjected to various reactions at elevated temperatures, have the tendency to polymerize, thereby making conversion thereof to more valuable distillable hydrocarbons extremely difficult.

Of the metallic contaminants, those containing nickel and vanadium are found to be most common, and generally occur in the form of thermally stable, organo-metallic complexes, such as metallic porphyrins and various derivatives thereof. A considerable quantity of the organo-metallic complexes are associated with asphaltenes and become concentrated in a residual fraction; some of the organo-metallic complexes are volatile, oil-soluble, and are, therefore, carried over into lighter distillate fractions. A reduction in the concentration of the organo-metallic complexes is not easily achieved, and to the extent that the crude oil, or other heavy hydrocarbon charge stock, becomes suitable for further processing. With respect to the hydrogenation, hydrorefining, hydrodesulfurization and/or hydrocracking of topped or reduced crude oils, atmospheric tower bottoms, and/or vacuum tower bottom product, containing excessive quantities of asphaltenic compounds, some of which are linked with the organo-metallic complexes, the primary difficulty resides in carbon formation due to the asphaltenic compounds, such carbon formation being favored as a result of the insolubility of these asphaltenic compounds. A gummy carbonaceous deposit is formed and causes the catalyst particles to become bound together, thereby restricting the flow of reactants through the catalyst bed. Furthermore, the presence of asphaltenes interferes with the capability of the catalyst to effect a reduction in sulfurous and introgenous compounds.

The desirability of removing the foregoing described contaminating influences is well-known within the art of petroleum refining and, heretofore, two principal approaches have been advanced: liquid phase hydrogenation and vapor phase hydrocracking. In the former type of process, the oil is passed upwardly in liquid phase and in admixture with hydrogen through a fixed bed, or slurry of sub-divided catalyst. Although perhaps effective in removing oil-soluble, organo-metallic complexes, such a process is relatively ineffective with respect to the oil-insoluble asphaltenes which are colloidally dispersed within the charge stock. Since the hydrogenation zone is at an elevated temperature, the retention of these unconverted asphaltenes, suspended in free liquid phase oil for an extended period of time, results in polymerization, causing conversion thereof to become substantially more difficult. Vapor phase hydrocracking is effected either with a fixed bed, or an expanded bed system at temperatures substantially above about 950° F. While this technique obviates to some extent the drawbacks of liquid phase hydrogenation, it is not well-suited to treat the heavy hydrocarbon fractions because their nonvolatility causes coke formation, with the result that the catalytic composite succumbs to rapid deactivation; this type of system requires a large capacity catalyst regeneration facility in order to implement the process on a continuous basis. Since the rate of diffusion of the oil-insoluble asphaltenes is significantly lower than that of dissolved molecules of approximately the same molecular size, a fixed bed process in which the charge stock and hydrogen are passed in a downwardly direction has been thought to be highly impractical. Selective hydrorefining and/or hydrocracking of a wide boiling range charge stock is not easily obtained, and excessive amounts of gases are produced at the expense of more valuable normally liquid hydrocarbons. The deposition of excessive quantities of gummy carbonaceous material results in plugging of fixed catalyst beds, as well as restriction of the recirculation in a fluidized catalyst system.

A principal object of the present invention is to provide a continuous process for hydrorefining an asphaltene-containing charge stock such as a petroleum crude oil, an atmospheric tower bottoms product, or a vacuum tower bottoms product, which process may be conducted continuously without incurring the detrimental effects otherwise experienced.

Another object is to provide a novel catalytic composite, the primary function of which is to convert the insoluble asphaltenic portion of the charge stock into oil-soluble materials. As a corollary to this object, the particular catalytic composite herein described effects a significant reduction in the concentration of sulfurous and nitrogenous compounds, and virtually eliminates completely the metallic contaminants within the hydrocarbonaceous charge stock.

Therefore, in a broad embodiment, the present invention affords a process for hydrorefining an asphaltenic hydrocarbonaceous charge stock containing at least one contaminant from the group of sulfurous and nitrogenous compounds, which process comprises reacting said charge stock with hydrogen at conditions including a pressure above about 1,000 p.s.i.g. and a temperature selected to convert sulfurous and nitrogenous compounds into hydrogen sulfide, ammonia and hydrocarbons, and at least a portion of said charge stock into lower-boiling liquid hydrocarbons, in contact with the calcined product of hydrated silica and at least one metallic component selected from the group consisting of the metals of Groups VI–B and VIII of the Periodic Table and compounds thereof.

This process is further characterized in that the catalytic composite is prepared from hydrated silica containing from about 5.0% to about 15.0% by weight of water of hydration, with which is combined molybdenum and iron-group component, prior to the calcination thereof. Generally, the concentrations of the catalytically active metallic components will be from about 4.0% to about 30.0% by weight of a Group VI–B metallic component, and from about 1.0% to about 6.0% by weight of a Group VIII metallic component, all concentrations being calculated as if the metallic component existed in the form of the elemental metal. The calcined product is prepared by combining hydrated silica containing from 5.0% to about 15.0% by weight of water of hydration, with, for example, nickel nitrate hexahydrate and phosphomolybdic acid, in amounts to yield a final product containing from 1.0% to 6.0% by weight of nickel and 4.0% to 30.0% by weight of molybdenum, calculated as the elemental metals. The resulting mixture is dried at a temperature of about 200° F. and thereafter calcined at a temperature within the range of 600° F. to 1200° F. The hydrorefining process conditions include a pressure of from 1,000 to about 3,000 p.s.i.g., a temperature within the range of about 600° F. to about 900° F., a weight hourly space velocity of about 0.25 to about 5.0 and a hydrogen concentration of from about 10,000 to about 100,000 s.c.f./bbl. of charge stock.

The heavy hydrocarbonaceous material, contemplated as the charge stock to which the present process is applicable, includes a full boiling range crude oil, having a gravity of about 23.2° API at 60° F., and contaminated by the presence of about 2.8% by weight of sulfur, 2700 p.p.m. of total nitrogen and about 100 p.p.m. of combined nickel and vanadium (computed as elemental nickel and vanadium), and containing a high-boiling pentane-insoluble asphaltenic fraction in an amount of about 8.4% by weight. When such a full boiling range crude oil is "topped," that is, having about 5.0% by volume of light-ends removal, the charge stock has a gravity of about 19.5° API at 60° F., and contains about 3.0% by weight of sulfur, 2900 p.p.m. of total nitrogen, 105 p.p.m. of nickel and vanadium, the asphaltenic fraction being about 8.8% by weight. The atmospheric tower bottoms product, being that portion of the crude oil boiling above a temperature above 672° F., has a gravity of 14.0° API at 60° F., contains 3.3% by weight of sulfur, 4000 p.p.m. of total nitrogen, about 130 p.p.m. of nickel and vanadium, and 13.4% by weight thereof constitutes the pentane-insoluble asphaltenic fraction.

In addition to the virtually complete conversion of the pentane-insoluble asphaltenic fraction into more valuable pentane-soluble liquid hydrocarbons, and the elimination of organo-metallic contaminants, the process of the present invention, utilizing the particular catalyst hereinafter described, effects a substantial conversion of the sulfurous and nitrogenous compounds into hydrogen sulfide, ammonia and hydrocarbons. Thus, the present invention is particularly advantageous when utilized as an integral part of a combination process, in that the remaining sulfurous and nitrogenous contaminants may be completely eliminated in a subsequent stage or zone, and without the interference otherwise resulting from the presence of the asphaltenic fraction. As hereinafter indicated in a specific example, the novel catalyst employed herein remains substantially in a free flowing condition notwithstanding extended periods of operation. As hereinbefore set forth, the tendency of the asphaltenic fraction and the organometallic contaminants is to undergo a variety of polymerization reactions as a result of which the catalytic composite becomes bound together in a singular mass bonded by the gummy polymerization products.

The catalytic composite utilized herein comprises at least one metallic component selected from the group consisting of the metals of Groups VI–B and VIII of the Periodic Table, and compounds thereof. Thus, the catalytic composite will contain one or more of the following metals, existing either in some combined form or in the elemental state: chromium, molybdenum, tungsten, iron, cobalt, nickel, ruthenium, rhodium, palladium, osmium, iridium, and platinum. The final catalytic composite has the capability to effect hydrorefining reactions while simultaneously being relatively immune to the deactivating influence of sulfurous compounds, and especially insensitive to nitrogenous compounds, and can be specifically tailored to meet the demands imposed by the particular physical and/or chemical characteristics of a given charge stock. However, an essential feature of the present invention resides in the character of the carrier material utilized in combination with the foregoing catalytically active metallic components. For the purposes of this invention, the carrier material is hydrated silica containing from about 5.0% to about 15.0% by weight of water of hydration. Contrary to present day practices, the carrier material is not subjected to a high-temperature calcination technique prior to compositing therewith the catalytically active metallic components. It is believed that the unique properties of the final catalytic composite stem from the presence of hydroxyl groups while the metallic components are combined with the hydrated silica.

Although any suitable means may be utilized for the preparation of the catalytic composite, a particularly convenient method employs an impregnation technique. The impregnating method of preparation involves initially forming an aqueous solution of water-soluble compounds of the desired metals, for example, nickel and molybdenum, and commingling the resulting solution with the hydrated silica carrier material. Suitable compounds include nickel nitrate hexahydrate, nickel chloride, ammonium molybdate, molybdic acid, phosphomolybdic acid, diamino-dinitrito platinum, chloroplatinic acid, chloropalladic acid, phosphotungstic acid, silicomolybdic acid, etc. The impregnated carrier material is dried at a temperature within the range of about 200° F. to about 300° F. for the purpose of removing excess physically-held water. The dry composite is thereafter subjected to a high temperature calcination technique, generally in an atmosphere of air, at a temperature of from about 600° F. to about 1200° F. The hydrated silica may be impregnated first with the molybdenum-containing solution, subsequently dried, and thereafter impregnated with the nickel-containing solution. On the other hand, the two solutions may be first commingled with each other and the carrier material impregnated in a single step. It is to be noted, however, that the hydrated silica is not subjected to high temperature calcination prior to the time the metallic components are combined therewith. The molybdenum and nickel, or other selected metallic components, after being composited with the hydrated silica, may be caused to exist therein in any desired form, and either as the element or as some compound thereof. Thus, the calcined composite may be further treated for the purpose of providing a catalyst in which the metals exist as sulfides, oxides, sulfates, or in their most reduced state. In the present specification and the appended claims, however, the concentrations of the catalytically active metallic components are computed on the basis that the same exist within the composite in the elemental state.

When the charge stock constitutes a crude tower bottoms product, or vacuum tower bottoms product, as distinguished from the full boiling range crude oil, a particularly satisfactory catalyst comprises the calcined product of hydrated silica which has been impregnated with nickel nitrate hexahydrate and phosphomolybdic acid in amounts to yield a final catalytic composite containing from 1.0% to 6.0% by weight of nickel and 4.0% to 30.0% by weight of molybdenum.

The following examples are given for the purpose of illustrating the means by which the process encompassed by the present invention is effected. The charge stock, temperatures, pressures, catalysts, rates, etc., are herein presented as being exemplary only, and are not intended to limit the invention to an extent greater than that defined by the scope and spirit of the appended claims. The charge stock utilized in the examples was an atmospheric tower bottoms derived from a full boiling range Wyoming sour crude oil. This tower bottoms product has an initial boiling point of 672° F., a gravity of 14.0° API at 60° F., and contains an asphaltenic fraction in an amount of 13.4% by weight; the contaminating influences are 3.3% by weight of sulfur, 4,000 p.p.m. of total nitrogen and 130 p.p.m. of nickel and vanadium.

EXAMPLE I

Utilizing the atmospheric tower bottoms above described, three different catalysts were individually subjected to a 75-hour test procedure conducted at hydrorefining conditions under which the formation of gummy polymerization products from the asphaltenic fraction would normally take place. The three catalysts were as follows:

(A) A calcined carrier material of 63.0% alumina and 37.0% silica, impregnated with 2.0% nickel and 16.0% molybdenum using an impregnating solution of nickel nitrate hexahydrate and molybdic acid. The impregnated carrier was dried at 210° F. and calcined in air at 1100° F.

(B) A calcined carrier material of 68.0% alumina, 10.0% silica and 22.0% boron phosphate impregnated, dried and calcined in the same manner as catalyst "A."

(C) Uncalcined, hydrated silica, containing 10.0% by weight of water of hydration, was impregnated, dried and calcined in the same manner as catalyst "A."

The catalysts "A" and "B" were employed in 200-gram quantities, and catalyst "C" in an amount of 100 grams. The weight hourly space velocity of the charge stock was 0.25 with respect to "A" and "B," and 0.50 with respect to "C." The operations were effected at 2,000 p.s.i.g., a hydrogen recycle rate of 20,000 s.c.f./bbl. of charge stock, and a reactor salt bath temperature of 725° F. The results and catalyst analyses after the 75-hour period are shown in the following table:

TABLE.—75-HOUR TEST FOR CARBON DEPOSITION

| Catalyst designation | A | B | C |
|---|---|---|---|
| Carbon on catalyst, wt. percent | 24.6 | 47.7 | 15.2 |
| Carbon deposit, wt. percent of charge | 1.58 | 2.40 | 0.31 |
| Average liquid recovery | 83.3 | 85.5 | 91.0 |
| Butanes and lighter in exit gas | 3.6 | 10.4 | 2.5 |

As will be recognized upon reference to the results tabulated above, the hydrated silica catalyst had deposited thereon only 0.31% by weight of the total charge processed, more liquid was recovered in the product effluent, and lesser quantities of methane, ethane, propane and butane remained in a free-flowing state after the test period was terminated, whereas other catalysts were free-flowing to an extent less than 80.0%.

EXAMPLE II

A catalyst prepared from hydrated silica containing 11.0% water of hydration, in which the 16.0% by weight of molybdenum had been incorporated by way of an isopropyl alcohol solution of phosphomolybdic acid, was tested for its hydrorefining properties in an 1800 ml. rocker-type autoclave. The catalyst, in an amount of 20 grams, was admixed with 200 grams of the tower bottoms in the autoclave at room temperature. The autoclave was then pressured to 100 atmospheres with hydrogen, and the temperature increased to 790° F., resulting in a final pressure of 215 atmospheres. These conditions prevailed for four hours, after which the autoclave was cooled and depressured, and the contents separated by centrifugal means.

Analyses on the liquid product effluent indicated a gravity of 32.8° API at 60° F., a reduction in pentane-insoluble material from 13.8% to 0.15% and a sulfur concentration of 0.15% by weight, down from 3.3% in the charge. Furthermore, following a thirty-day storage period, there was no evidence of sludge formation as often occurs with colloidally dispersed asphaltenic material. Through inadvertence, no nitrogen analysis was performed on the liquid product effluent. However, the light yellow color thereof is indicative of about 75.0% nitrogen removal.

EXAMPLE III

Two additional catalysts were prepared by an impregnation technique to contain 2.0% by weight of nickel and 16.0% by weight of molybdenum, using nickel nitrate hexahydrate and molybdic acid. The first catalyst was prepared utilizing uncalcined hydrated silicia, whereas the second catalyst was prepared utilizing silica which had been calcined at a temperature of 1200° F. The former catalyst, prepared on the hydrated silica, resulted in an 11.5% increase in the conversion of the asphaltenic fraction.

From the foregoing specification and examples, the advantages inherent in the catalytic process of the present invention will be readily recognized. This hydrorefining process, characterized by the use of a particular catalyst, effectively eliminates the asphaltenic fraction within heavy hydrocarbonaceous charge stocks, while simultaneously decreases the concentration of other contaminating influences to levels which are readily tolerated in subsequent hydrorefining processes, especially in the absence of the asphaltenes.

We claim as our invention:

1. A process for hydrorefining an asphaltenic hydrocarbonaceous charge stock containing at least one contaminant from the group of sulfurous compounds, and nitrogenous compounds, which process comprises reacting said charge stock with hydrogen at hydrorefining conditions including a pressure above about 1,000 p.s.i.g., and a temperature selected to convert sulfurous and nitrogenous compounds into hydrogen sulfide, ammonia and hydrocarbons, and at least a portion of said charge stock into lower-boiling liquid hydrocarbons, and in contact with a catalyst prepared by combining hydrated silica containing from about 5.0% to about 15.0% by weight of water of hydration with from about 4.0% to about 30.0% by weight of molybdenum, drying the resulting composite and thereafter calcining the dried composite at a temperature of from about 600° F. to about 1200° F.

2. The process of claim 1 further characterized in that said catalyst comprises molybdenum and from about 1.0% to about 6.0% by weight of an iron group metal.

3. The process of claim 2 further characterized in that said iron group metal is nickel.

4. The process of claim 1 further characterized in that said conditions include a pressure of from 1,000 to about 3,000 p.s.i.g., a temperature within the range of from 600° F. to about 900° F., a weight hourly space velocity of about 0.25 to about 5.0 and a hydrogen concentration of from 10,000 to about 100,000 s.c.f./bbl. of said charge stock.

5. The process of claim 1 further characterized in that said catalyst is prepared by combining said hydrated silica with phosphomolybdic acid in an amount to yield a final product containing from about 4.0% to 30.0% by weight of molybdenum, calculated as the elemental metal, drying the resulting mixture at a temperature of from about 200° F. to about 300° F., and thereafter calcining the dried composite.

References Cited

UNITED STATES PATENTS

| 3,262,874 | 7/1966 | Gatsis | 208—254 |
| 3,269,958 | 8/1966 | Gatsis | 208—254 |
| 3,278,421 | 10/1966 | Gatsis | 208—216 |

DELBERT E. GANTZ, *Primary Examiner.*

G. J. CRASANAKIS, *Assistant Examiner.*

U.S. Cl. X.R.

208—217; 252—458, 459